United States Patent [19]
Giulie et al.

[11] Patent Number: 5,905,546
[45] Date of Patent: May 18, 1999

[54] DETACHABLE VISOR FOR LAP-TOP COMPUTER MONITOR

[76] Inventors: Jean W. Giulie; Joe D. Giulie, both of 924 Chevy Way, Medford, Oreg. 97504

[21] Appl. No.: 08/909,368

[22] Filed: Aug. 11, 1997

[51] Int. Cl.⁶ ..................................................... A04N 5/64
[52] U.S. Cl. ........................... 348/842; 348/843; 359/601
[58] Field of Search ...................... 348/818, 842, 348/843, 834, 832, 836; 359/609, 601; H04N 5/64

[56] References Cited

U.S. PATENT DOCUMENTS

| | | | |
|---|---|---|---|
| 3,849,598 | 11/1974 | Hoffberger, II et al. | 348/842 |
| 4,444,465 | 4/1984 | Giulie et al. | 350/276 R |
| 4,633,324 | 12/1986 | Giulie | 358/255 |
| 4,848,874 | 7/1989 | Mui et al. | 359/609 |
| 4,863,242 | 9/1989 | Correa | 359/601 |
| 4,865,420 | 9/1989 | Schmidt | 350/276 R |
| 5,115,345 | 5/1992 | Hobson et al. | 359/601 |
| 5,218,474 | 6/1993 | Kirschner | 359/601 |
| 5,237,453 | 8/1993 | Jones | 359/601 |
| 5,818,635 | 10/1998 | Hohn et al. | 359/612 |

*Primary Examiner*—Brian L. Casler
*Assistant Examiner*—Luanne P. Din
*Attorney, Agent, or Firm*—Bruce H. Johnsonbaugh

[57] ABSTRACT

A detachable and foldable visor is provided for use on a lap-top or portable computer monitor. The visor has a central panel and two side panels adapted to extend across the top and the sides of the monitor. Multiple score lines are provided between the central panel and side panels to facilitate using the visor on monitors of different widths. Mounting tabs are connected to or on the side panels which cooperate with a rubber band or other flexible retainer to exert a tensile force holding the visor onto the monitor. The visor is foldable into a compact and flat position in which it can be easily carried in the same case as the lap-top or portable computer.

4 Claims, 4 Drawing Sheets

DETACHABLE VISOR FOR LAP-TOP COMPUTER MONITOR

BACKGROUND AND BRIEF SUMMARY OF THE INVENTION

The present invention relates to a detachable visor for use on a lap-top or portable computer monitor. More particularly, the invention provides a detachable visor which can be folded into a compact package and carried easily with a lap-top computer, and which can be readily mounted onto the lap-top computer monitor to reduce glare, facilitate outdoor use of the monitor and to provide privacy.

It is known in the prior art to provide a shield which fits over the cabinet of a cathode ray tube monitor. U.S. Pat. No. 4,633,324 dated Dec. 30, 1986 provides one type of shield having a plurality of thin strips lying side-by-side held in alignment by a flexible material and covering the top and both sides of the monitor. U.S. Pat. No. 4,444,465 dated Apr. 24, 1984 provides an adjustable shield which fits over the cabinet of a computer monitor to reduce glare on the screen and to provide security.

With the ever increasing popularity of lap-top computers, there is a need for an easily portable and detachable shield or visor for use on those portable devices The prior art devices referred to above are intended for relatively long term use on the monitor and are not readily detachable or foldable into a compact and easily carried configuration.

According to the present invention, a visor for use on a lap-top computer monitor is provided having a closed or folded position in which it is essentially flat and easily carried with the lap-top computer In its open position, it is readily mounted onto the monitor of the lap-top computer and effectively reduces glare, facilitates outdoor use of the monitor and provides privacy or security relative to material displayed on the monitor.

A primary object of the present invention is to provide a visor for use on a portable or lap-top computer monitor which can be easily carried with the computer and which can be readily mounted onto the lap-top monitor and readily returned to its closed or folded position.

Another object of the invention is to provide a lightweight portable and detachable visor or shield for portable computer monitors.

Other objects and advantages of the invention will become apparent from the following description and the drawings wherein:

DETAILED DESCRIPTION OF THE DRAWINGS

Figure 1:
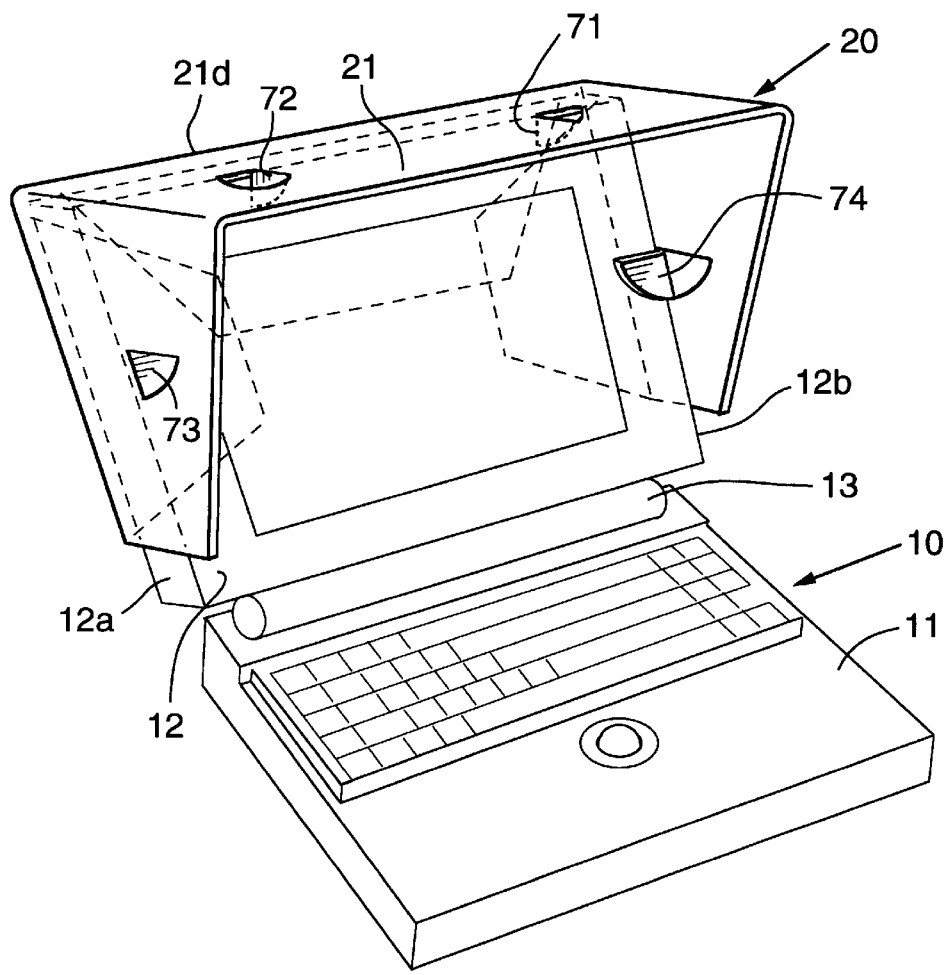
FIG. 1 is a perspective view of a typical lap-top computer with the visor according to the present invention mounted on the computer monitor.
Figure 2:
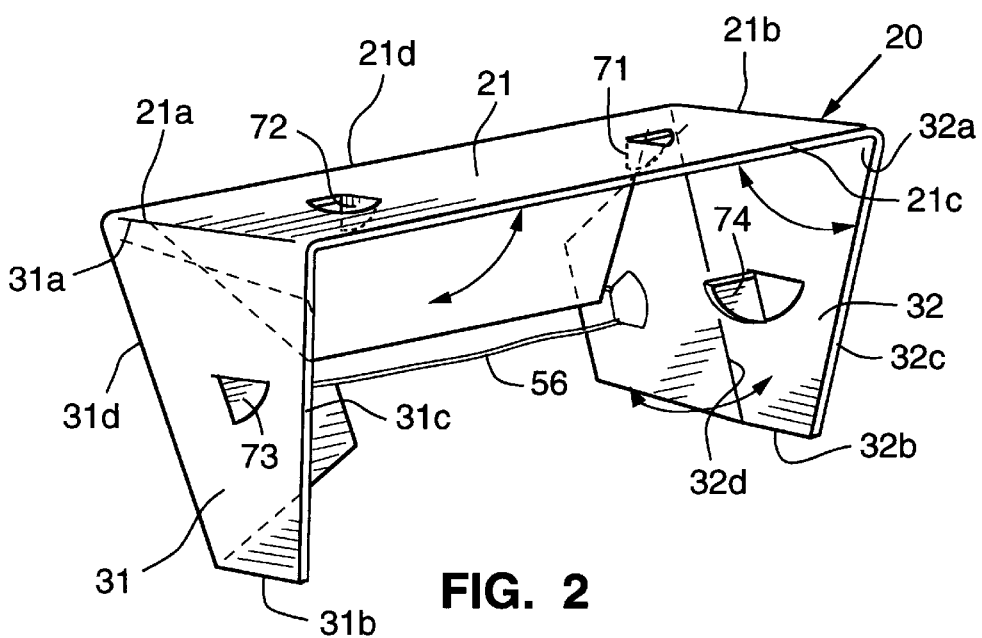
FIG. 2 is a perspective view of the visor according to the present invention in its open position, ready to be mounted on the computer monitor.
Figure 3:
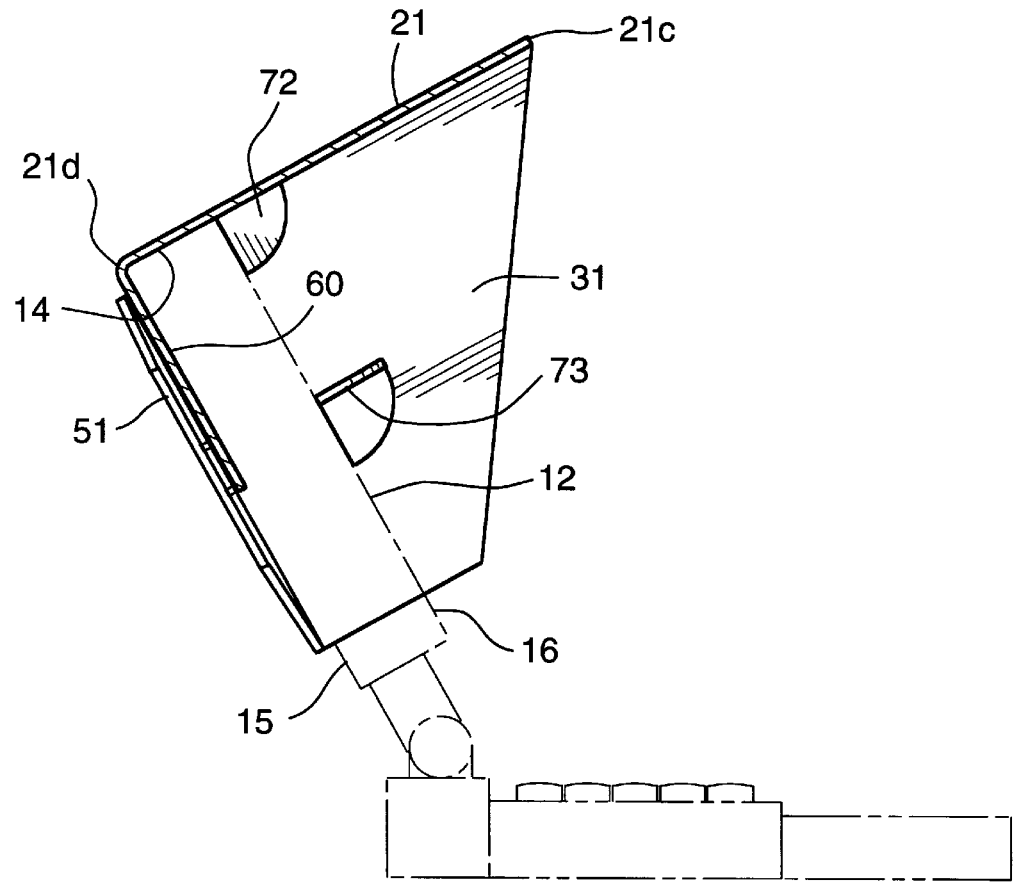
FIG. 3 is a side elevational view showing the visor mounted on the lap-top computer monitor.
Figure 4:
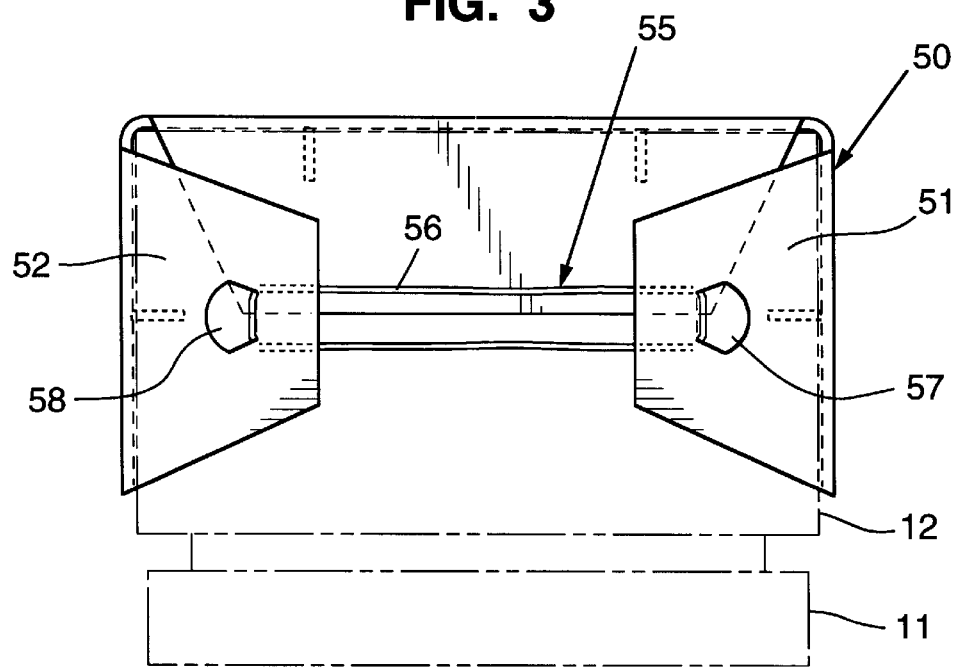
FIG. 4 is a rear elevational view showing the visor mounted on the monitor.

FIG. 1 shows a typical lap-top computer 10 having a base 11 and a monitor 12. The phrase "lap-top computer" is used herein and in the claims in a broad sense to include conventional lap-top computers and small portable computers in general The monitor 12 is typically pivotally connected to base 11 by a hinge 13 which allows the monitor 12 to be rotated between its open position shown in FIG. 1 and a closed position in which it is parallel with and adjacent to base 11.

Figure 7:
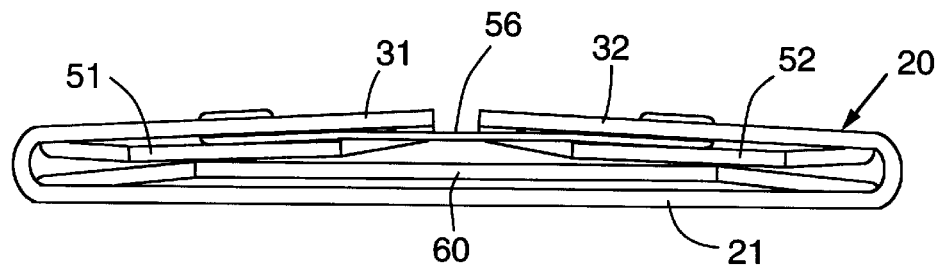
FIG. 7 is an elevational view showing the visor in its closed or folded position in which it can be easily carried with a lap-top computer.

According to the present invention, a visor shown generally as 20 is provided which has an open position as shown in FIGS. 1–4 wherein it may be mounted onto monitor 12. The visor 20 also has a compact closed or folded position shown in FIG. 7 wherein its various components are parallel with each other and closely adjacent to each other for ease of storage and portability. In its closed position shown in FIG. 7, the visor 20 may be easily carried in the same briefcase (or other carrying case) as the computer 10 Referring to FIGS. 1–4, the visor 20 has a central panel 21 of generally rectangular configuration and having sides 21a and 21b, a front edge 21c and a rear edge 21d. In use, the rear edge 21d of central panel 21 extends across the top 14 of monitor 12 and is generally aligned with the backside 15 of monitor 12. The front edge 21c extends outwardly, toward the user, from the monitor 12.

First and second side panels 31 and 32 have upper edges 31a and 32a, lower edges 31b and 32b, respectively, front edges 31c and 32c and rear edges 31d and 32d, respectively Side panels 31 and 32 are connected to central panel 21 along their upper edges 31a and 32a, respectively, and the side panels 31 and 32 extend along the sides 12a and 12b of monitor 12 when the visor 20 is in its open position shown in FIGS. 1–4.

Figure 5:
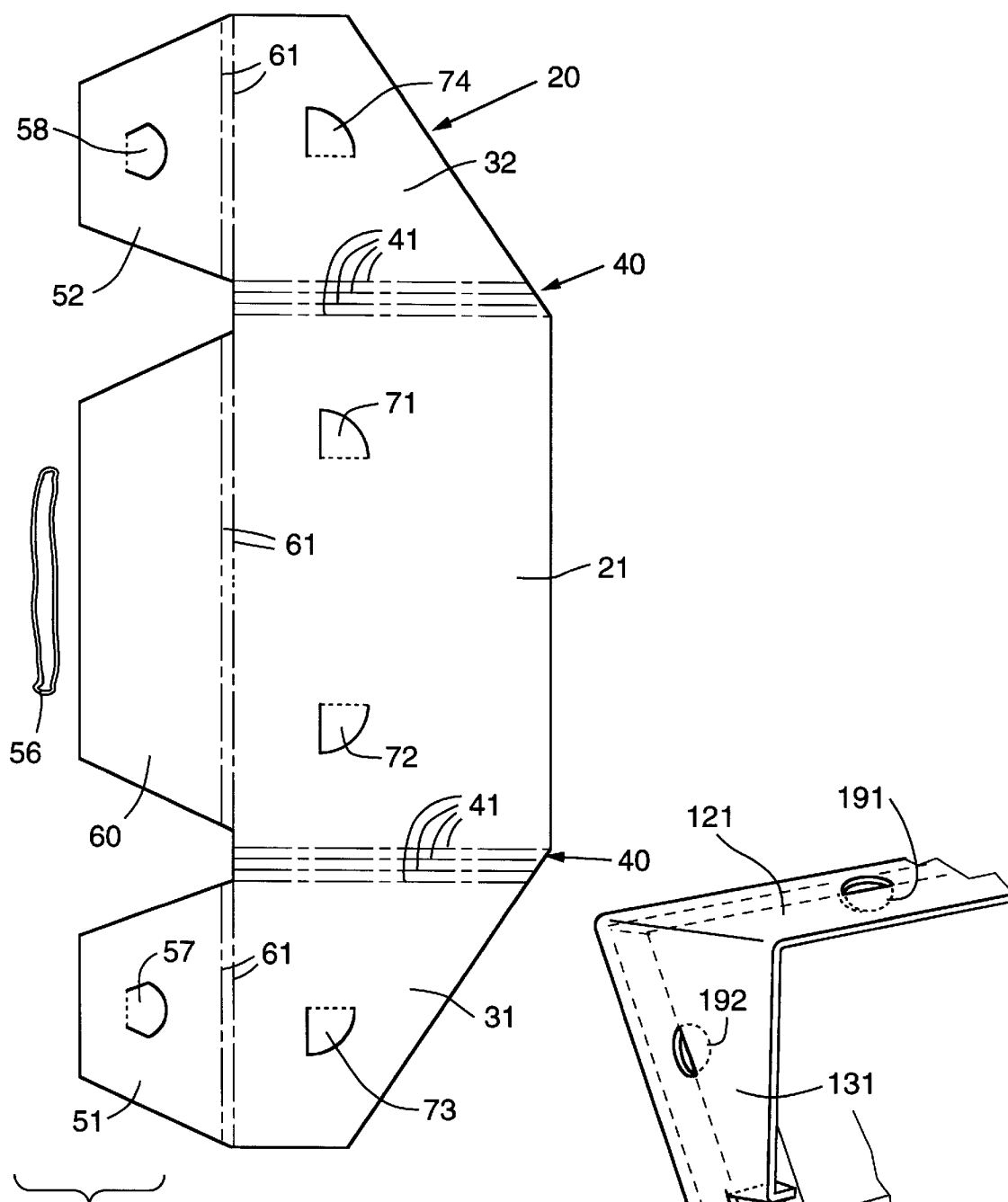
FIG. 5. is a plan view showing the visor of the present invention unfolded and lying flat.

Referring to FIG. 5, folding means shown generally as 40 are provided between central panel 21 and side panels 31 and 32. In the embodiment shown in FIG. 5, folding means comprises a plurality of score lines 41. Score lines 41 form a series of fold lines from which the user can select the appropriate fold line. In the embodiment shown in FIG. 5, four score lines are provided between central panel 21 and side panel 31 and an identical pattern of four score lines formed between central panel 21 and side panel 32. The purpose of score lines 41 is to provide a variable width for central panel 21 to accommodate different lap-top computer monitors having different widths. The embodiment shown in FIG. 5 includes a plurality of score lines between the central panel 21 and both of the side panels. However, it is to be understood that it is within the spirit of this invention to provide one score line, for example, between central panel 21 and side panel 31 and a plurality of score lines between central panel 21 and side panel 32. It is also within the scope of this invention to provide other types of fold lines, such as perforations or lines of reduced thickness Another type of fold line is the corrugation line of corrugated cardboard The visor 20 may be constructed of cardboard or scorable plastic such as polypropylene. Polypropylene has the advantage that repeated opening and closing of the visor does not tend to weaken the material on the fold line. In fact, polypropylene effectively provides a durable "living hinge."

A connecting means shown generally as 50 (FIG. 4) is provided for holding the visor 20 onto the monitor 12.

Connecting means 50 includes first and second side mounting tab means 51 and 52 which are connected to first and second side panels 31 and 32, respectively In the open position of the visor 20, the first and second side mounting tab means 51 and 52 are parallel to and are adjacent the backside 15 of monitor 12. In the closed position of visor 12, the side mounting tab means 51 and 52 are parallel with the central panel 21 and side panels 31 and 32 and closely adjacent thereto.

Connecting means 50 also includes resilient holding means 55. Resilient holding means 55 includes a rubber band 56 in the embodiment shown in FIG. 4 along with tabs 57 and 58 formed in side mounting tab means 51 and 52 by generally C-shaped cuts formed therein. The rubber band 56 exerts a tensile force between tabs 51 and 52 which holds the visor 20 securely onto monitor 12 in the open position of the visor shown in FIGS. 1–4. In the closed position, shown in FIG. 7, the rubber band 56 tends to hold the visor 20 in its closed and folded position.

Referring to FIG. 5, a top mounting tab 60 having a generally trapezoidal shape is connected to central panel 21. In the open position of the visor 20, top mounting tab 60 extends across the backside of monitor 15 and extends downwardly from the top 14 of the monitor 15.

In the preferred embodiment shown in FIGS. 1–5, the top mounting tab 60 helps connect the visor to the monitor. However, it is to be understood that the top mounting tab 60 can be deleted and the visor can be mounted to the monitor by the side mounting tabs 51 and 52 and the rubber band 56 extending between tabs 51 and 52.

As shown best in FIG. 5, a plurality of score lines 61 is preferably provided between the top mounting tab 60 and central panel 21 as well as between side mounting tabs 51 and 52 and side panels 31 and 32, respectively, to accommodate monitors having different thicknesses.

As shown best in FIG. 5, retaining tabs 71 and 72 are formed in central panel 21 and retaining tabs 73 and 74 are formed in side panels 31 and 32, respectively. Each of the foldable retaining tabs 71–74 has a first position when the visor is open, as shown in FIGS. 1–4, wherein the tabs extend outwardly from central panel 21 and side panels 31 and 32 and extend part way across the front side 16 of monitor 12 to prevent the visor 20 from slipping or sliding backwardly off the monitor 12, as shown best in FIG. 3. Each of the retaining tabs 71–74 is foldable to a position where it is parallel with central panel 21 or side panels 31 and 32, respectively, to allow the visor 20 to be folded into the compact position shown in FIG. 7 wherein all of the significant elements of the visor are aligned parallel to and closely adjacent each other.

Figure 6:
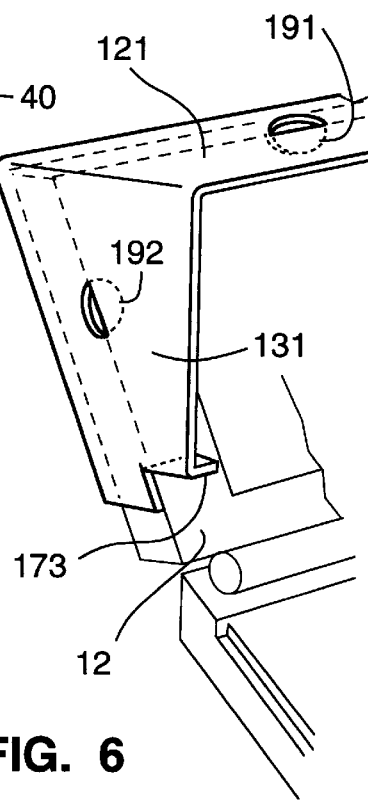
FIG. 6 is a perspective view of an alternate form of the invention.

FIG. 6 shows an alternate embodiment having retaining tab 173 formed at the lower edge of side panel 131, and retaining tab 191 formed in central panel 121 to prevent overhead light or sunlight from striking monitor 12. Retaining tab 192 is formed in side panel 131 to prevent light from striking monitor 12.

Figure 8:
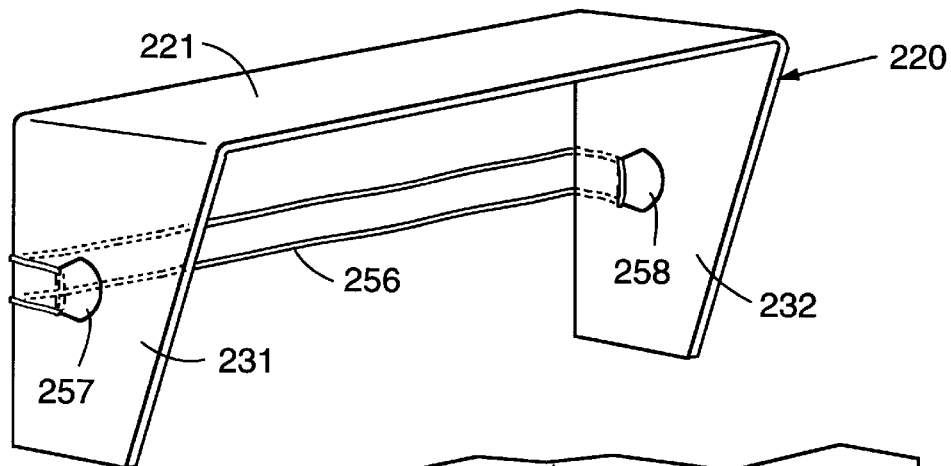
FIG. 8 is a perspective view of an alternate form of the invention.

FIG. 8 is a perspective view of an alternate embodiment 220 having central panel 221 and side panels 231 and 232. The connecting means in this embodiment includes tabs 257 and 258 formed in side panels 231 and 232, respectively, and rubber band 256. Rubber band 256 extends across the entire width of the monitor and onto tabs 257 and 258. The embodiment of FIG. 8 deletes the side mounting tabs 51 and 52 shown in FIGS. 1–5.

Figure 9:
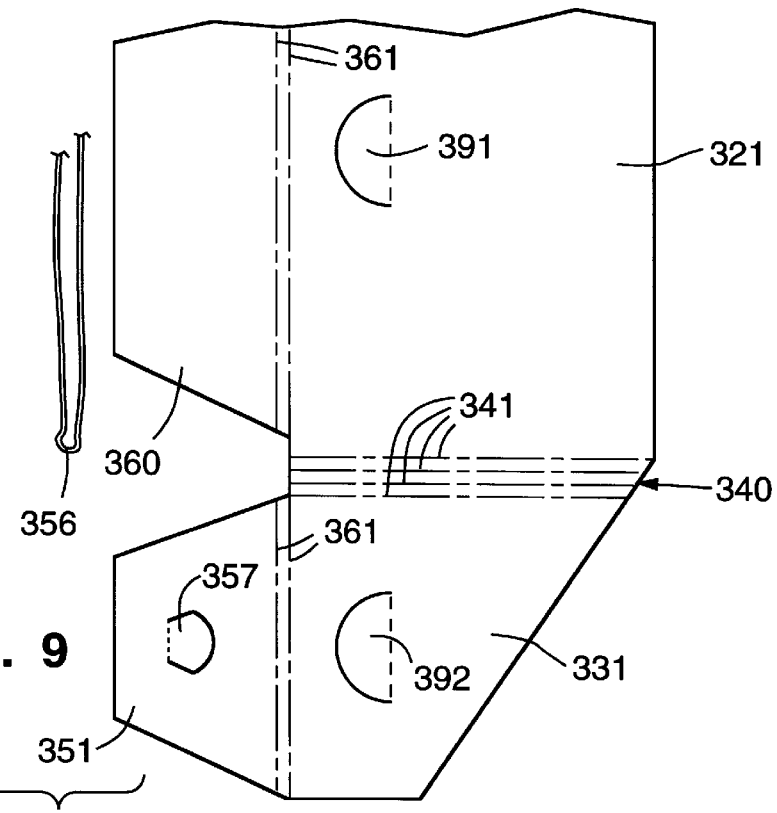
FIG. 9 is a plan view of an alternate embodiment of the invention.

FIG. 9 shows another embodiment which is identical to the embodiment shown in FIGS. 1–5 except for retaining tabs 391 and 392. Tab 391 is formed in central panel 321 at a position which is above monitor 12, so that when tab 391 is bent downwardly, it prevents the visor from falling off monitor 12 and prevents overhead light or sunlight from striking monitor 12. Tab 392 is formed in side panel 331, helps prevent the visor from falling off monitor 12, and also prevents light from passing through side panel 331 and striking monitor 12.

It is understood that variations may be made in the design of the visor without departing from the spirit of the invention. For example, central panel 21 is shown having a generally rectangular configuration but that configuration could be rounded on the front edge or it could have other configurations Similarly, the side panels are shown as tapered panels having straight edges but those edges could be non-tapered or rounded. Other variations in the design may be made without departing from the spirit of the invention.

What is claimed is:

1. A visor for a portable or lap-top computer monitor wherein said computer has a base and a monitor pivotally connected to said base, and wherein said visor can be readily manipulated between a closed position in which it may be easily stored and/or carried and an open position wherein it is mounted on said monitor to reduce glare, facilitate outdoor use of said monitor and to provide privacy, comprising:

a central panel adapted to extend across the top of and outwardly from said monitor when said visor is in its open position, first and second side panels connected to said central panel, said side panels adapted to extend along both sides of said monitor when said visor is in its open position, folding means between said central panel and said side panels allowing said side panels to be folded relative to said central panel, said folding means also allowing said side panels to move readily between said open position wherein said visor is mounted on said monitor and said closed position wherein said side panels are parallel with and adjacent to said central panel, first and second side mounting tab means connected to said first and second side panels said side mounting tab means being foldable between an open position wherein both of said side mounting tab means are parallel to and adjacent the back side of said monitor and a closed position wherein said side mounting tab means are parallel with said central panel and said side panels, and resilient holding means extending between said side mounting tab means along the back side of said monitor when said visor is mounted on said monitor.

2. The apparatus of claim 1 further comprising a top mounting tab connected to said central panel, said top mounting tab being foldable between an open position wherein it is parallel to and adjacent the back side of said monitor and a closed position wherein it is parallel with said central panel and said side panels.

3. The apparatus of claim 2 wherein said resilient holding means exerts a tensile force between said side mounting tabs when said visor is mounted on said monitor to hold the visor securely on the monitor, and wherein said resilient holding means also exerts a tensile force between said side mounting tabs when said visor is in its closed position to hold said visor in a compact, folded closed position.

4. The apparatus of claim 3 further comprising one or more foldable retaining tabs carried by said central panel and said side panels, said foldable retaining tabs having a first position when said visor is open wherein said foldable retaining tabs extend outwardly from said central panel and said side panels and extend partway across the front side of said monitor and a second position wherein said foldable retaining tabs are parallel with said central panel and said side panels.

\* \* \* \* \*